US011927969B2

(12) United States Patent
Baloch et al.

(10) Patent No.: US 11,927,969 B2
(45) Date of Patent: Mar. 12, 2024

(54) CONTROL SYSTEM AND METHOD FOR ROBOTIC MOTION PLANNING AND CONTROL

(71) Applicant: Transportation IP Holdings, LLC, Norwalk, CT (US)

(72) Inventors: Ghulam Ali Baloch, Niskayuna, NY (US); Huan Tan, Niskayuna, NY (US); Balajee Kannan, Niskayuna, NY (US); Charles Theurer, Alplaus, NY (US)

(73) Assignee: Transportation IP Holdings, LLC, Norwalk, CT (US)

( * ) Notice: Subject to any disclaimer, the term of this patent is extended or adjusted under 35 U.S.C. 154(b) by 554 days.

(21) Appl. No.: 16/934,046

(22) Filed: Jul. 21, 2020

(65) Prior Publication Data
US 2020/0348686 A1    Nov. 5, 2020

Related U.S. Application Data

(63) Continuation of application No. 15/282,102, filed on Sep. 30, 2016, now abandoned, and a
(Continued)

(51) Int. Cl.
*G05D 1/00* (2006.01)
*B25J 9/16* (2006.01)

(52) U.S. Cl.
CPC ............ *G05D 1/0246* (2013.01); *B25J 9/162* (2013.01); *G05D 1/0061* (2013.01);
(Continued)

(58) Field of Classification Search
CPC .. G05D 1/0246; G05D 1/0061; G05D 1/0248; G05D 1/0274; G05D 2201/0216;
(Continued)

(56) References Cited

U.S. PATENT DOCUMENTS 6,496,755 B2  12/2002  Wallach et al.
6,836,701 B2  12/2004  McKee
(Continued)

FOREIGN PATENT DOCUMENTS

CN    104122843    10/2014

OTHER PUBLICATIONS

Hsiang Low et al., "Integrated planning and control of mobile robot with self-organizing neural network", Robotics and Automation, 2002. Proceedings. ICRA '02. IEEE International Conference on, vol. 4, pp. 3870-3875, 2002.
(Continued)

*Primary Examiner* — Truc M Do
(74) *Attorney, Agent, or Firm* — Jason P. Gross; The Small Patent Law Group, LLC

(57) ABSTRACT

A system includes a robotic vehicle having a propulsion and a manipulator configured to perform designated tasks. The system also including a local controller disposed onboard the robotic vehicle and configured to receive input signals from an off-board controller. Responsive to receiving an input signal for moving in an autonomous mode, the local controller is configured to move the robotic vehicle toward one of the different final destinations by autonomously and iteratively determining a series of waypoints until the robotic vehicle has reached the one final destination. For each iteration, the local controller is configured to determine a next waypoint between a current location of the robotic vehicle and the final destination, determine movement limitations of the robotic vehicle, and generate control signals in accordance with the movement limitations.

18 Claims, 3 Drawing Sheets

Related U.S. Application Data continuation-in-part of application No. 16/240,237, filed on Jan. 4, 2019, now Pat. No. 11,020,859, which is a continuation-in-part of application No. 15/292,605, filed on Oct. 13, 2016, now abandoned, said application No. 16/240,237 is a continuation-in-part of application No. 15/885,289, filed on Jan. 31, 2018, now Pat. No. 10,252,424, which is a continuation of application No. 14/702,014, filed on May 1, 2015, now Pat. No. 9,889,566, said application No. 16/240,237 is a continuation-in-part of application No. 15/058,560, filed on Mar. 2, 2016, now Pat. No. 10,272,573.

(60) Provisional application No. 62/342,448, filed on May 27, 2016, provisional application No. 62/342,510, filed on May 27, 2016, provisional application No. 62/269,377, filed on Dec. 18, 2015, provisional application No. 62/269,425, filed on Dec. 18, 2015, provisional application No. 62/269,481, filed on Dec. 18, 2015, provisional application No. 62/269,523, filed on Dec. 18, 2015.

(52) U.S. Cl.
CPC ......... *G05D 1/0248* (2013.01); *G05D 1/0274* (2013.01); *G05B 2219/39082* (2013.01); *G05B 2219/40282* (2013.01); *G05B 2219/40424* (2013.01); *G05B 2219/45084* (2013.01); *G05D 2201/0216* (2013.01); *Y10S 901/01* (2013.01); *Y10S 901/47* (2013.01)

(58) Field of Classification Search
CPC ........... B25J 9/162; G05B 2219/39082; G05B 2219/40282; G05B 2219/40424; G05B 2219/45084; Y10S 901/01; Y10S 901/47
See application file for complete search history.

(56) References Cited

U.S. PATENT DOCUMENTS

| | | | |
|---|---|---|---|
| 8,583,313 B2 | 11/2013 | Mian | |
| 8,688,275 B1 | 4/2014 | LaFary et al. | |
| 9,085,080 B2 | 7/2015 | Mian | |
| 9,146,558 B2 | 9/2015 | Field | |
| 2001/0037163 A1* | 11/2001 | Allard | G05D 1/0282 700/245 |
| 2002/0049530 A1 | 4/2002 | Poropat | |
| 2007/0156286 A1 | 7/2007 | Yamauchi | |
| 2008/0027591 A1 | 1/2008 | Lenser | |
| 2008/0086241 A1* | 4/2008 | Phillips | G05D 1/0038 701/2 |
| 2009/0037033 A1 | 2/2009 | Phillips | |
| 2010/0263948 A1 | 10/2010 | Couture | |
| 2011/0054689 A1* | 3/2011 | Nielsen | G05D 1/0088 700/258 |
| 2011/0267047 A1 | 11/2011 | Lawrence et al. | |
| 2013/0116880 A1* | 5/2013 | Shitamoto | G05D 1/024 701/25 |
| 2015/0199458 A1 | 7/2015 | Bacon | |
| 2016/0059416 A1 | 3/2016 | Tian et al. | |

OTHER PUBLICATIONS

Niu et al., "Advanced Robot Navigation System's Signal Processing Based on GPS/INS", Intelligent Information Technology Application, 2008. IITA '08. Second International Symposium on, vol. 3, pp. 244-248, Dec. 20-22, 2008, Shanghai.

\* cited by examiner

300

CONTROL SYSTEM AND METHOD FOR ROBOTIC MOTION PLANNING AND CONTROL

CROSS-REFERENCE TO RELATED APPLICATIONS

This application is a continuation of Ser. No. 15/282,102 (U.S. Pat. Pub. No. 2017-0341235), which was filed on 30 Sep. 2016 and claims priority to U.S. Provisional Application No. 62/342,448, filed 27 May 2016, the entire disclosure of each is incorporated herein by reference.

This application is also a continuation-in-part of U.S. patent application Ser. No. 16/240,237 (U.S. Pat. Pub. No. 2019-0134821) (hereinafter "the '237 Application"), which was filed on Jan. 4, 2019 and which is a continuation-in-part of U.S. patent application Ser. No. 15/292,605 (U.S. Pat. Pub. No. 2017-0341236), which was filed on Oct. 13, 2016 and which claims priority to U.S. Provisional Application No. 62/342,510, filed May 27, 2016, the entire disclosure of each is incorporated herein by reference.

The '237 Application is also a continuation-in-part of and claims priority to U.S. patent application Ser. No. 15/885,289, filed Jan. 31, 2018, and is titled "Systems and Methods for Control of Robotic Manipulation" that claims priority to, and is a continuation of, U.S. patent application Ser. No. 14/702,014 (now U.S. Pat. No. 9,889,566), filed 1 May 2015, and entitled "Systems and Methods for Control of Robotic Manipulation," the entire subject matter of each is incorporated herein by reference.

The '237 Application is also a continuation-in-part of and claims priority to U.S. patent application Ser. No. 15/058,560 (U.S. Pat. Pub. No. 2017-0173790, filed Mar. 2, 2016, and is titled "Control System and Method for Applying Force to Grasp a Brake Lever", that claims priority to U.S. Provisional Application Nos. 62/269,523; 62/269,425; 62/269,377; and 62/269,481, all of which were filed on 18 Dec. 2015, and the entire disclosure of each is incorporated herein by reference.

FIELD

The subject matter described herein relates to systems and methods for autonomously controlling movement of a device.

BACKGROUND

The challenges in the modern vehicle yards are vast and diverse. Classification yards, or hump yards, play an important role as consolidation nodes in vehicle freight networks. At classification yards, inbound vehicle systems (e.g., trains) are disassembled and the cargo-carrying vehicles (e.g., railcars) are sorted by next common destination (or block). The efficiency of the yards in part drives the efficiency of the entire transportation network.

The hump yard is generally divided into three main areas: the receiving yard, where inbound vehicle systems arrive and are prepared for sorting; the class yard, where cargo-carrying vehicles in the vehicle systems are sorted into blocks; and the departure yard, where blocks of vehicles are assembled into outbound vehicle systems, inspected, and then depart.

Current solutions for field service operations are labor-intensive, dangerous, and limited by the operational capabilities of humans being able to make critical decisions in the presence of incomplete or incorrect information. Furthermore, efficient system level-operations require integrated system wide solutions, more than just point solutions to key challenges. The nature of these missions dictates that the tasks and environments cannot always be fully anticipated or specified at the design time, yet an autonomous solution may need the essential capabilities and tools to carry out the mission even if it encounters situations that were not expected.

Solutions for typical vehicle yard problems, such as brake bleeding, brake line lacing, coupling cars, etc., can require combining mobility, perception, and manipulation toward a tightly integrated autonomous solution. When placing robots in an outdoor environment, technical challenges largely increase, but field robotic application benefits both technically and economically.

One challenge in using automated robotic systems to perform maintenance of the vehicles in the yard is ensuring that the robotic systems safely move through the yard. For example, safeguards are needed to ensure that the robotic systems do not collide with other objects (stationary or moving) and that the robotic systems are able to respond to a dynamically changing environment (e.g., where an object moves into the path of a moving robotic system), while also attempting to ensure that the robotic systems move toward locations for performing the vehicle maintenance along efficient paths (e.g., the shortest possible path or the path that is shorter than one or more other paths, but not all paths).

BRIEF DESCRIPTION

In an embodiment, a system is provided that includes a robotic vehicle having a propulsion system configured to propel the robotic vehicle between different final destinations and a manipulator configured to perform designated tasks. The system also includes one or more sensors disposed onboard the robotic vehicle configured to obtain image data representative of an external environment and to sense operation of the manipulator. The system also includes a local controller disposed onboard the robotic vehicle and configured to receive input signals from an off-board controller. Responsive to receiving an input signal for moving in an autonomous mode, the local controller is configured to move the robotic vehicle toward one of the different final destinations by autonomously and iteratively determining a series of waypoints until the robotic vehicle has reached the one final destination. For each iteration, the local controller is configured to determine a next waypoint between a current location of the robotic vehicle and the final destination. The local controller is also configured to determine movement limitations of the robotic vehicle for moving the robotic vehicle between the current location and the next waypoint. The movement limitations are based on the image data of the external environment including the current location and the next waypoint. The movement limitations are configured to avoid collisions between the robotic vehicle and one or more objects in the external environment. The local controller is also configured to generate control signals in accordance with the movement limitations that are configured to move the robotic vehicle toward the next waypoint. Responsive to receiving the input signal for operating in a tele-operation mode, the local controller is configured to exit the autonomous mode.

In an embodiment, a method is provided that includes obtaining, at a local controller disposed onboard a robotic vehicle, image data representative of an external environment of the robotic vehicle. The external environment includes a designated area where the robotic vehicle performs tasks. The designated area including final destinations. Responsive to receiving an input signal for moving the robotic vehicle in an autonomous mode, the method further includes iteratively generating, by the local controller, control signals for moving the robotic vehicle through a series of waypoints toward one of the different final destinations, wherein each of the iterations includes determining a next waypoint between a current location of the robotic vehicle and the final destination. Each iteration also includes determining movement limitations of the robotic vehicle for moving the robotic vehicle between the current location and the next waypoint. The movement limitations are based on the image data of the external environment including the current location and the next waypoint. The movement limitations are configured to avoid collisions between the robotic vehicle and one or more objects in the external environment. Each iteration also includes generating control signals in accordance with the movement limitations that are configured to move the robotic vehicle toward the next waypoint. Responsive to receiving an input signal for operating in a tele-operation mode, the method further comprises exiting the autonomous mode.

In one embodiment, a robotic system includes a robotic vehicle having a propulsion system configured to propel the robotic vehicle, one or more sensors configured to be disposed onboard the robotic vehicle and to obtain image data representative of an external environment, and a controller configured to be disposed onboard the robotic vehicle and to determine a waypoint for the robotic vehicle to move toward. The waypoint is located between a current location of the robotic vehicle and a final destination of the robotic vehicle. The controller also is configured to determine limitations on movement of the robotic vehicle toward the waypoint. The limitations are based on the image data. The controller is configured to control the propulsion system to move the robotic vehicle to the waypoint subject to the limitations on the movement to avoid colliding with one or more objects. The controller also is configured to determine one or more additional waypoints subsequent to the robotic vehicle reaching the waypoint, determine one or more additional limitations on the movement of the robotic vehicle toward each of the respective additional waypoints, and control the propulsion system of the robotic vehicle to sequentially move the robotic vehicle to the one or more additional waypoints.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
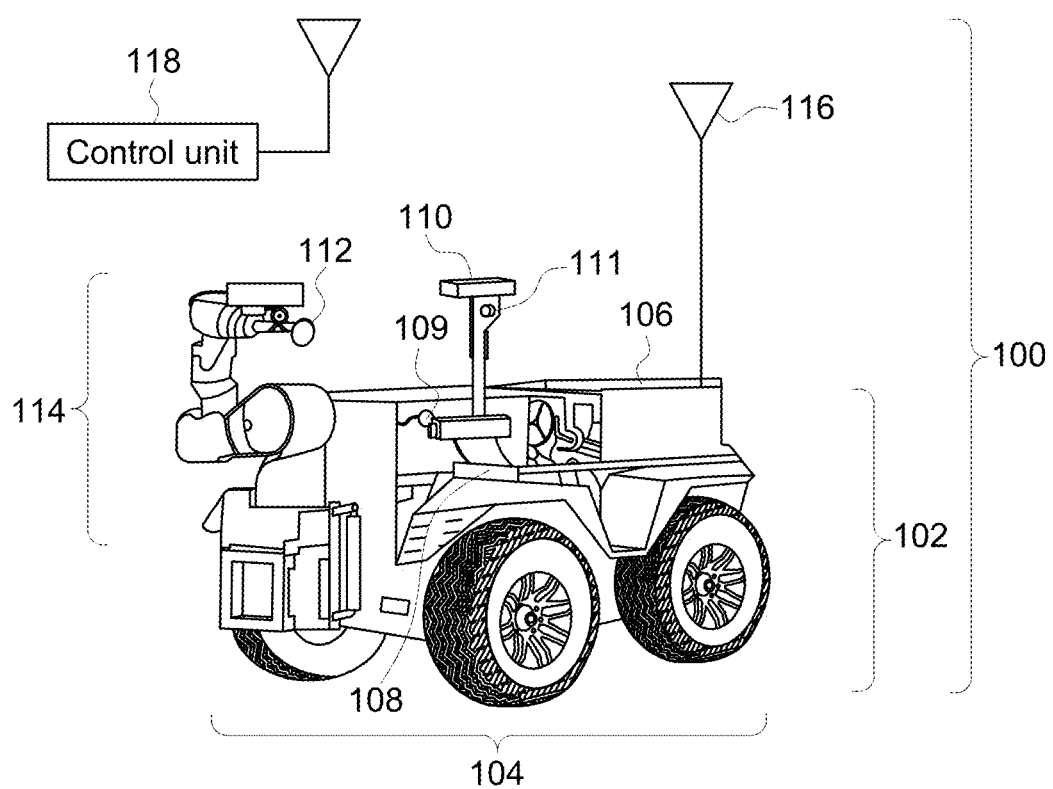
FIG. 1 illustrates one embodiment of a robotic system.

FIG. 1 illustrates one embodiment of a robotic system 100. The robotic system 100 may be used to autonomously move toward, grasp, and actuate (e.g., move) a brake lever or rod on a vehicle in order to change a state of a brake system of the vehicle. For example, the robotic system 100 may autonomously move toward, grasp, and move a brake rod of an air brake system on a rail car in order to bleed air out of the brake system. The robotic system 100 includes a robotic vehicle 102 having a propulsion system 104 that operates to move the robotic system 100. The propulsion system 104 may include one or more motors, power sources (e.g., batteries, alternators, generators, etc.), or the like, for moving the robotic system 100. A controller 106 of the robotic system 100 includes hardware circuitry that includes and/or is connected with one or more processors (e.g., microprocessors, field programmable gate arrays, and/or integrated circuits) that direct operations of the robotic system 100.

The robotic system 100 also includes several sensors 108, 109, 110, 111, 112 that measure or detect various conditions used by the robotic system 100 to move toward, grasp, and actuate brake levers. The sensors 108-111 are optical sensors, such as cameras, infrared projectors and/or detectors. While four optical sensors 108, 110 are shown, alternatively, the robotic system 100 may have a single optical sensor, less than four optical sensors, or more than four optical sensors. In one embodiment, the sensors 109, 111 are RGB cameras and the sensors 110, 112 are structured-light three-dimensional (3-D) cameras, but alternatively may be another type of camera.

The sensor 112 is a touch sensor that senses operation of the manipulator, such as detecting when a manipulator arm 114 of the robotic system 100 contacts or otherwise engages a surface or object. The touch sensor 112 may be one or more of a variety of touch-sensitive devices, such as a switch (e.g., that is closed upon touch or contact), a capacitive element (e.g., that is charged or discharged upon touch or contact), or the like. Alternatively, one or more of the sensors 108-112 may be another type of sensor, such as a radar sensor, LIDAR sensor, etc.

The manipulator arm 114 is an elongated body of the robotic system 100 that can move in a variety of directions, grasp, and pull and/or push a brake rod. The controller 106 may be operably connected with the propulsion system 104 and the manipulator arm 114 to control movement of the robotic system 100 and/or the arm 114, such as by one or more wired and/or wireless connections. The controller 106 may be operably connected with the sensors 108-112 to receive data obtained, detected, or measured by the sensors 108-112.

The robotic system 100 can include a communication device 116 that communicates with an off-board control unit 118. The communication device 116 can represent one or more antennas and associated transceiving circuitry, such as one or more modems, transceivers, receivers, transmitters, etc. The control unit 118 can represent hardware circuitry that includes and/or is connected with one or more processors (e.g., microprocessors, field programmable gate arrays, or integrated circuits) that receives user input to remotely control movement and other operation of the robotic system 100. In one embodiment, the control unit 118 also represents one or more input devices, such as joysticks, touchscreens, styluses, keyboards, etc., to allow a user to remotely control movement and other operations of the robotic system 100. The control unit 118 also can include one or more antennas and associated transceiving circuitry to allow wireless communication with the communication device 116 of the robotic system 100. Alternatively or additionally, the communication device 116 of the robotic system 100 may be connected with the control unit 118 by one or more wired connections to allow for remote control of the robotic system 100 via the wired connection(s).

Figure 2:
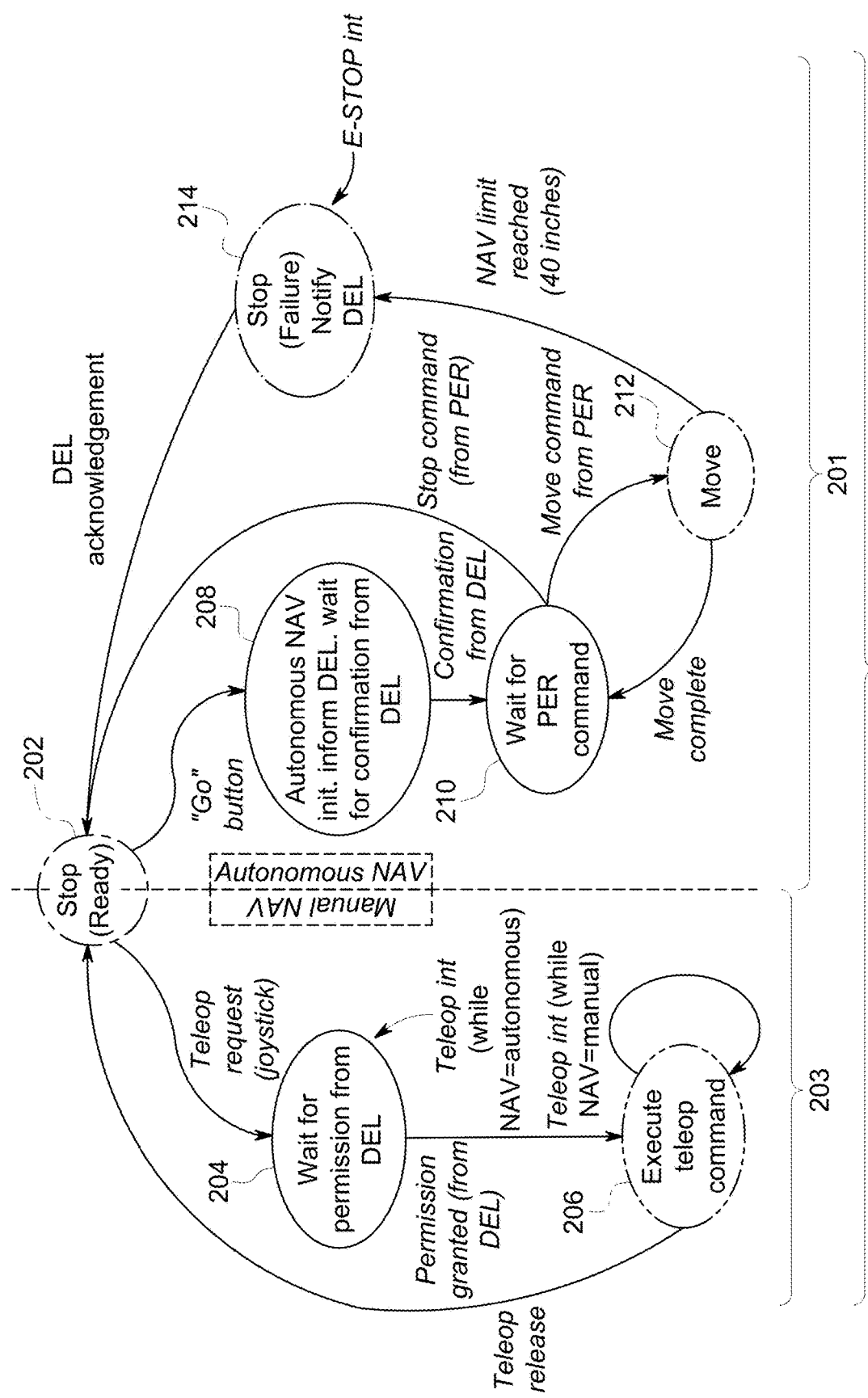
FIG. 2 illustrates a flowchart of a method or state diagram of operation of a controller of the robotic system shown in FIG. 1 in directing movement of the robotic system according to one embodiment.

FIG. 2 illustrates a state diagram 200 of operation of the controller 106 in directing movement of the robotic system 100 shown in FIG. 1 according to one embodiment. The state diagram 200 can represent a flowchart of a method for controlling movement of the robotic system 100, and may represent or be used to create software that directs operation of the controller 106.

The controller 106 may operate using the method represented by the state diagram 200 to move the robotic system 100 between or among different locations (e.g., in vehicle yards or other locations) to perform tasks, such as maintenance, inspection, repair, etc., of the vehicles. The controller 106 may operate in different operational modes. One mode can be referred to as an autonomous navigation mode and another mode can be referred to as tele-operation mode. Operations performed or controlled by the controller 106 can be referred to herein as modules. The modules can represent different sets of functions performed by the same or different processors of the controller 106, and/or can represent different hardware components (e.g., processors and associated circuitry) performing the functions associated with the respective modules.

At 202, the robotic system 100 is in a ready state. The ready state may involve the robotic system 100 being stationary and prepared to begin movement. The controller 106 may monitor the communication device 116 (or wait for a signal from the communication device 116) to indicate whether the robotic system 100 is to begin movement. The controller 106 may receive an input signal from the control unit 118 via the communication device 116 and/or from an input device of the robotic system 100 (e.g., one or more buttons, knobs, switches, touchscreens, keyboards, etc.). Responsive to receiving the input signal, the controller 106 may determine whether the input signal indicates that the robotic system 100 is to operate in the autonomous navigation mode (also referred to as "Autonomous NAV" in FIG. 2; e.g., the operations or states shown in connection with 201 in FIG. 2) or the tele-operation (or manual navigation or remote control) mode (also referred to as "Manual NAV" in FIG. 2; e.g., the operations or states shown in connection with 203 in FIG. 2). The input signal may indicate that the robotic system 100 is to operate in the tele-operation mode if the input signal indicates movement of the input device of the control unit 118, such as movement of a joystick or other input. The input signal may indicate that the robotic system 100 is to operate in the autonomous navigation mode if the input signal indicates other actuation of the input device of the control unit 118, such as selection of an input that indicates autonomous operation.

If the controller 106 determines that the robotic system 100 is to operate in the tele-operational mode 203, then flow of the method or state diagram 200 may proceed toward 204. If the controller 106 determines that the robotic system 100 is to operate in the autonomous navigation mode 201, then flow of the method or state diagram 200 may proceed toward 208.

At 204, the robotic system 100 determines if a permissive signal to move has been generated or provided. The permissive signal may be generated or provided by a deliberation module of the controller 106. The deliberation module receives input from the control unit 118, such as movement of a joystick or other input that indicates a direction of movement, speed, and/or acceleration of the robotic system 100. The deliberation module of the controller 106 also examines data or other information provided by one or more of the sensors 108-112 to determine whether movement, as requested or dictated by the input received from the control unit 118, is feasible and/or safe. For example, the deliberation module of the controller 106 can obtain two dimensional (2D) image data (e.g., 2D images or video) from the sensors 109 and/or 111, three dimensional (3D) image data (e.g., 3D images or video, point clouds, etc.) from the sensors 108 and/or 110, and/or detection of engagement or touch of an object from the sensor 112. The deliberation module can examine this data to determine if the movement requested by the control unit 118 can be performed without the robotic system 100 colliding with another object or operating in another unsafe manner. For example, the deliberation module can examine the 2D and/or 3D image data to determine if one or more obstacles remain in the movement path requested by the input. As described in more detail below, the image data provided by one or more of the sensors 108-111 can be used to determine whether any objects are in the path of the robotic system 100.

If the controller 106 (e.g., the deliberation module) determines that the robotic system 100 can move according to the input provided by the control unit 118 at 202, then flow of the method or state diagram 200 continues toward 206. Otherwise, the method or state diagram 200 may remain at 204 until permission to move is received from or otherwise provided by the deliberation module of the controller 106.

At 206, the robotic system 100 moves according to the input provided by or otherwise received from the control unit 118. For example, responsive to receiving permission to move the robotic system 100 according to the input provided by the control unit 118, the controller 106 may generate control signals that are communicated to the propulsion system 104 of the robotic system 100 to move the robotic system 100 according to the input. Upon completion of the movement, the propulsion system 104 may stop moving the robotic system 100 and flow of the method or state diagram 200 may return toward 204.

If, at 204, it is determined that the robotic system 100 is to operate in the autonomous navigation mode 201, then flow of the method or state diagram 200 may proceed toward 208. For example, if the input received by the controller 106 from the control unit 118 indicates that the robotic system 100 is to autonomously move, then flow may proceed toward 208.

At 208, a navigation module of the controller 106 informs the deliberation module that autonomous movement of the robotic system 100 has been initiated. This can involve the controller 106 from the manual navigation mode to the autonomous navigation mode. The robotic system 100 may remain stationary and optionally prohibit movement of the robotic system 100 until confirmation of the change from the manual to autonomous navigation mode has been received. This confirmation may be provided from the deliberation module of the controller 106.

Responsive to receiving confirmation that the autonomous movement of the robotic system 100 has been initiated, at 210, a determination is made as to whether the robotic system 100 can move. This determination may involve examining data provided by one or more of the sensors 108-112, in addition to or exclusive of other data provided to or accessible by the controller 106. For example, in addition to the image data provided by one or more of the sensors 108-111, the controller 106 may access a memory or database (not shown) onboard or off-board the robotic system 100 (e.g., via the communication device 116). The controller 106 can obtain information such as a current location of the robotic system 100 (e.g., via a global positioning system receiver or data), locations of vehicles in the vehicle yard, numbers of vehicles in a vehicle consist that the robotic system 100 is to move alongside, known or designated locations of objects in or around the robotic system 100, etc.

A perception module of the controller 106 can examine the sensor data and/or other data to determine how to autonomously move the robotic system 100. The perception module can examine this data to determine how to safely and efficiently move the robotic system 100 without intervention (or at least additional intervention) from a human operator.

Figure 3:
FIG. 3 illustrates one example of sensor data that can be examined by the controller shown in FIG. 1 to determine how to autonomously move the robotic system also shown in FIG. 1.

FIG. 3 illustrates one example of sensor data 300 that can be examined by the controller 106 to determine how to autonomously move the robotic system 100. The sensor data 300 is a point cloud that represents locations of different points in 3D space. The sensor data 300 may be obtained from a structured light sensor, such as a Microsoft KINECT camera device or other structured light sensor. The point cloud indicates where different objects are located relative to the sensor 108, 110 that provided the data used to create the point cloud. The perception module of the controller 106 can examine the point cloud to determine if there are any objects that the robotic system 100 could collide with. Based on the locations of the points in the point cloud, the perception module of the controller 106 can determine how far the object is from the sensor that provided the data used to generate the point cloud. Optionally, the controller 106 may examine other data, such as 2D or 3D images obtained by the sensors 108-111, detection of touch as determined by the sensor 112, radar data provided by one or more sensors, or other data, to determine the presence, distance to, relative location, etc., of other object(s) around the robotic system 100.

Returning to the description of the method or state diagram 200 shown in FIG. 2, at 210, the perception module examines the data to determine whether the robotic system 100 can move without colliding with another object (stationary or moving) and, if the robotic system 100 can move without a collision, where the robotic system 100 can move. For example, the controller 106 can examine the data to determine allowable limits on where the robotic system 100 can move. These limits can include restrictions on how far the robotic system 100 can move in one or more directions, how fast the robotic system 100 can move in one or more directions, and/or how quickly the robotic system 100 can accelerate or decelerate in one or more directions. The controller 106 may hold off on moving the robotic system 100 until the determination is made as to whether the robotic system 100 can move and limitations on how the robotic system 100 can move.

At 212, the robotic system 100 autonomously moves. In one embodiment, the navigation module of the controller 106 determines a waypoint location for the robotic system 100 to move toward. The waypoint location may be a geographic location that is between a current location of the robotic system 100 and a final, destination, or goal location that the robotic system 100 is moving toward. For example, if the robotic system 100 is to move five meters to a brake lever of a vehicle in order to grasp and pull the brake lever (e.g., to bleed an air brake of the vehicle), the navigation module may generate control signals to cause the robotic system 100 to move to a waypoint that is fifty centimeters (or another distance) toward the brake lever from the current location of the robotic system 100, but that is not at the location of the brake lever.

Figure 4:
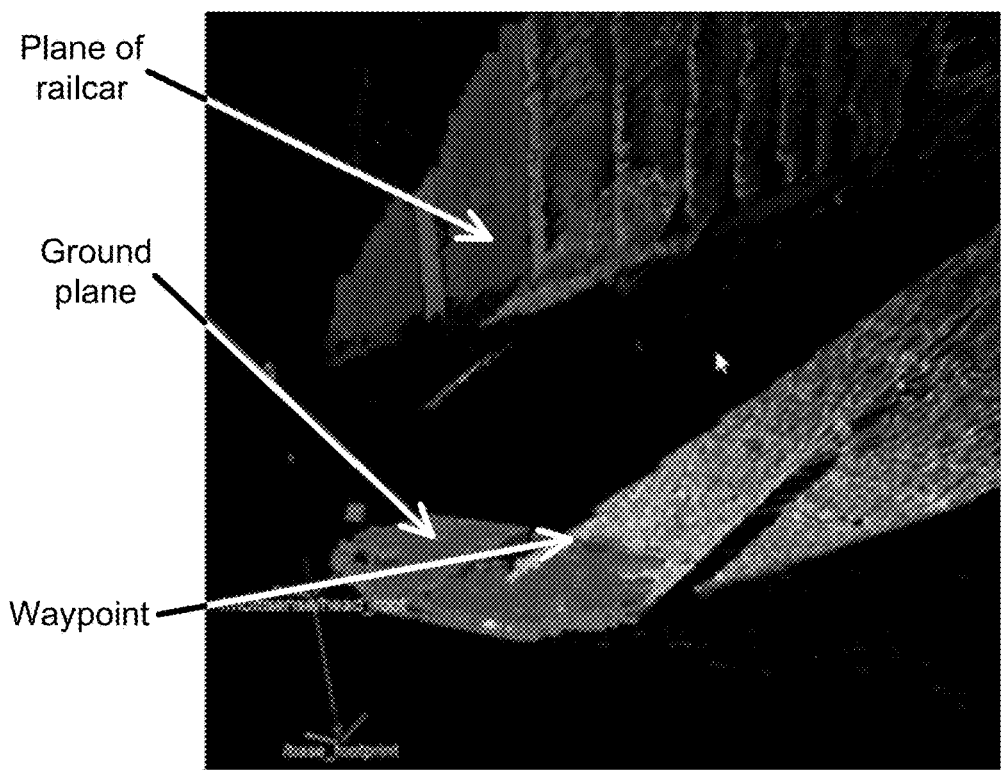
FIG. 4 illustrates one example of a waypoint location that can be determined for the robotic system shown in FIG. 1.

FIG. 4 illustrates one example of a waypoint location that can be determined for the robotic system 100. The navigation module can use the sensor data (and/or other data described herein) and determine locations of other objects ("Plane of Railcar" in FIG. 4), the surface on which the robotic system 100 is moving ("Ground Plane" in FIG. 4), and/or the waypoint location to which the robotic system 100 is moving ("Waypoint" in FIG. 4). For example, the point cloud obtained from one or more of the sensors 108, 110 can be examined to determine locations of the other objects and/or surface shown in FIG. 4.

In one embodiment, the controller 106 can determine the locations of objects using the data with simultaneous localization and mapping (SLAM). For example, the controller 106 can use real-time appearance-based mapping (RTAB-Map) to identify the locations of objects.

The navigation module of the controller 106 can generate control signals to dictate how the robotic system 100 moves toward the waypoint location. These control signals may designate the direction of movement, the distance that the robotic system 100 is to move, the moving speed, and/or acceleration based on the current location of the robotic system 100, the waypoint location, and/or limitations determined by the perception module of the controller 106 (described below). The navigation module generates control signals that are communicated to the propulsion system 104 of the robotic system 100. These control signals direct the motors and other components of the propulsion system 104 how to operate to move the robotic system 100.

Movement of the robotic system 100 can be monitored to determine whether the movement of the robotic system 100 has or will violate one or more predefined or previously designated limits. In the illustrated example, the robotic system 100 is not allowed to move more than forty inches (e.g., 102 centimeters). Optionally, another distance limitation or other limitation (e.g., a limitation on an upper or lower speed, a limitation on an upper or lower acceleration, a limitation on a direction of movement, etc.) may be used. If the movement of the robotic system 100 reaches or violates one or more of these limitations, flow of the method or state diagram 200 can proceed toward 214.

In one embodiment, the controller 106 determines the movements of the robotic system 100 to try and achieve different goals. One goal is to move the robotic system 100 so as to minimize or reduce the distance between the robotic system 100 and the desired location, such as the next waypoint (relative to moving the robotic system 100 along one or more, or all, other feasible paths to the next waypoint). Another goal is to keep at least a designated safe distance between the robotic system 100 and one or more other objects, such as rail tracks on which the vehicles are disposed. The controller 106 can determine commands for the propulsion system 104 that drive the robotic system 100 toward the next waypoint and fuse these commands with commands that keep the robotic system 100 away from the vehicles (or other objects), by at least a designated, non-zero distance (e.g., four inches or ten centimeters). These commands are combined by the controller 106 to determine a velocity command that will control the propulsion system 104 of the robotic system 100 to move. The fusion can be a weighted sum of the commands:

$$\text{cmd}_{vel} = \alpha * \text{cmd}_{goal} + \beta * \text{cmd}_{safety} \qquad (1)$$

$$\alpha + \beta = 1 \qquad (2)$$

where $\text{cmd}_{vel}$ represents the velocity command, $\text{cmd}_{goal}$ and $\text{cmd}_{safety}$ are generated using the artificial potential field algorithm, and α and β are parameters that are tuned or set based on the task-relevant situations.

At 214, movement of the robotic system 100 is stopped. The navigation module of the controller 106 can generate and communicate an alarm signal to the propulsion system 104 that stops movement of the robotic system 100. This signal can direct motors to stop rotating wheels of the vehicle 102 of the robotic system 100 and/or direct a brake of the vehicle 102 to stop movement of the robotic system 100. Flow of the method or state diagram 200 may then return toward 202.

But, if movement of the robotic system 100 does not reach or violate the limitation(s), then the robotic system 100 may continue autonomously moving toward the waypoint location. The following motion will be determined through a decision making process (e.g., motion and energy optimization). As described above, the navigation module may direct the propulsion system 104 to move the robotic system 100 to move toward, but not all the way to, a destination or goal location. Instead, the navigation module can direct the propulsion system 104 to move the robotic system 100 part of the way to the destination or goal location.

The robotic system 100 moves toward the waypoint location subject to the limitations described above. Upon reaching the waypoint location, flow of the method or state diagram 200 can return toward 210 from 212. For example, the perception module can again determine whether the robotic system 100 can move based on the sensor data and/or other data, as described above. At least a portion of the method or state diagram 200 may repeat one or more times or iterations between perceiving the surroundings, determining a subsequent waypoint, determining limitations on movement toward the waypoint, and moving to the waypoint. Eventually, the final waypoint may be at or near the final destination of the robotic system 100.

In one or more embodiments, a system is provided that includes a robotic vehicle having a propulsion system configured to propel the robotic vehicle between different final destinations and a manipulator configured to perform designated tasks. The system also includes one or more sensors disposed onboard the robotic vehicle configured to obtain image data representative of an external environment and to sense operation of the manipulator. The system also includes a local controller disposed onboard the robotic vehicle and configured to receive input signals from an off-board controller. Responsive to receiving an input signal for moving in an autonomous mode, the local controller is configured to move the robotic vehicle toward one of the different final destinations by autonomously and iteratively determining a series of waypoints until the robotic vehicle has reached the one final destination. For each iteration, the local controller is configured to determine a next waypoint between a current location of the robotic vehicle and the final destination. The local controller is also configured to determine movement limitations of the robotic vehicle for moving the robotic vehicle between the current location and the next waypoint. The movement limitations are based on the image data of the external environment including the current location and the next waypoint. The movement limitations are configured to avoid collisions between the robotic vehicle and one or more objects in the external environment. The local controller is also configured to generate control signals in accordance with the movement limitations that are configured to move the robotic vehicle toward the next waypoint. Responsive to receiving the input signal for operating in a tele-operation mode, the local controller is configured to exit the autonomous mode.

Optionally, the input signal for operating in the tele-operation mode may include a remote command that dictates at least one of a movement of the robotic vehicle or a movement of the manipulator. The local controller is configured to determine whether the remote command is permissible, wherein, responsive to determining that the remote command is permissible, the local controller is configured to generate control signals for performing the remote command.

Optionally, the local controller is configured to withhold issuing the control signals for performing the remote command until the local controller determines that the remote command is permissible.

Optionally, the remote command may include at least one of a direction of movement, a speed, or an acceleration.

Optionally, the one or more objects can include movable objects that travel along a pathway. The movement limitations restrict movement of the robotic vehicle to at least a designated distance away from the pathway. For example, the movable objects may include vehicles (e.g., rail cars).

Optionally, the pathway is a fixed pathway, such as rail tracks on which the vehicles are disposed, and the final destinations are adjacent to the movable objects along the fixed pathway. The local controller is also configured to generate control signals for controlling the manipulator to perform a task related to the movable objects.

Optionally, the local controller is also configured to identify the final destinations based on the image data. The final destination can include a task object for the manipulator to engage.

Optionally, the local controller is configured to determine the movement limitations using simultaneous localization and mapping (SLAM) of the image data.

Optionally, the system also may include the off-board controller. The off-board controller may include an input device configured to be manipulated by a user of the off-board controller.

Optionally, the off-board controller is connected to the local controller via a wired connection and communicates to the local controller through the wired connection.

In one or more embodiments, a method is provided that may include obtaining, at a local controller disposed onboard a robotic vehicle, image data representative of an external environment of the robotic vehicle. The external environment may include a designated area where the robotic vehicle performs tasks. For example, the tasks may be performed at different final destinations within the designated area. Responsive to receiving an input signal for moving the robotic vehicle in an autonomous mode, the method further may include iteratively generating, by the local controller, control signals for moving the robotic vehicle through a series of waypoints toward one of the different final destinations, wherein each of the iterations may include determining a next waypoint between a current location of the robotic vehicle and the final destination. Each iteration also may include determining movement limitations of the robotic vehicle for moving the robotic vehicle between the current location and the next waypoint. The movement limitations are based on the image data of the external environment including the current location and the next waypoint. The movement limitations are configured to avoid collisions between the robotic vehicle and one or more objects in the external environment. Each iteration also may include generating control signals in accordance with the movement limitations that are configured to move the robotic vehicle toward the next waypoint. Responsive to receiving an input signal for operating in a tele-operation mode, the method further comprises exiting the autonomous mode.

Optionally, the input signal for operating in the tele-operation mode may include a remote command that dictates at least one of a movement of the robotic vehicle or a movement of a manipulator of the robotic vehicle. The method also may include determining whether the remote command is permissible, wherein, responsive to determining that the remote command is permissible, generating control signals for performing the remote command.

Optionally, the control signals for performing the remote command are withheld until the remote command is determined to be permissible.

Optionally, the remote command may include at least one of a direction of movement, a speed, or an acceleration.

Optionally, the one or more objects can include movable objects that travel along a pathway. The movement limitations restrict movement of the robotic vehicle to at least a designated distance away from the pathway.

Optionally, the waypoints are at most fifty centimeters apart.

Optionally, the method also may include identifying the final destinations based on the image data. The final destinations can include a task object for a manipulator of the robotic vehicle to engage.

Optionally, determining the movement limitations may include using simultaneous localization and mapping (SLAM) of the image data.

Optionally, the method also may include performing a task at the one final destination using a manipulator of the robotic vehicle.

Optionally, the movement limitations for moving toward different waypoints can include at least one of a different direction of movement, a different speed, or a different acceleration of the robotic vehicle.

In one embodiment, a robotic system includes a robotic vehicle having a propulsion system configured to propel the robotic vehicle, one or more sensors configured to be disposed onboard the robotic vehicle and to obtain image data representative of an external environment, and a controller configured to be disposed onboard the robotic vehicle and to determine a waypoint for the robotic vehicle to move toward. The waypoint is located between a current location of the robotic vehicle and a final destination of the robotic vehicle. The controller also is configured to determine limitations on movement of the robotic vehicle toward the waypoint. The limitations are based on the image data. The controller is configured to control the propulsion system to move the robotic vehicle to the waypoint subject to the limitations on the movement to avoid colliding with one or more objects. The controller also is configured to determine one or more additional waypoints subsequent to the robotic vehicle reaching the waypoint, determine one or more additional limitations on the movement of the robotic vehicle toward each of the respective additional waypoints, and control the propulsion system of the robotic vehicle to sequentially move the robotic vehicle to the one or more additional waypoints.

In one example, the one or more sensors are configured to obtain a point cloud of the external environment using one or more structured light sensors.

In one example, controller is configured to determine the limitations on the movement of the robotic vehicle by determining relative locations of one or more objects in the external environment based on the image data and restricting movement of the robotic vehicle to avoid colliding with the one or more objects.

In one example, the controller is configured to determine the limitations using simultaneous localization and mapping to restrict the movement of the robotic vehicle.

In one example, the controller also is configured to stop movement of the robotic vehicle responsive to the robotic vehicle moving farther than a designated, non-zero distance toward the waypoint.

In one example, the final destination of the robotic vehicle is a brake lever of a vehicle.

In one example, the controller also is configured to switch between manual control of the movement of the robotic vehicle and autonomous movement of the robotic vehicle based on input received from a control unit disposed off-board the robotic vehicle.

In one embodiment, a method includes obtaining image data representative of an environment external to a robotic system, determining a waypoint for the robotic system to move toward, the waypoint located between a current location of the robotic system and a final destination of the robotic system, determining limitations on movement of the robotic system toward the waypoint. The limitations are based on the image data, controlling a propulsion system of the robotic system to move the robotic system to the waypoint subject to the limitations on the movement to avoid colliding with one or more objects, determining one or more additional waypoints subsequent to the robotic system reaching the waypoint, determining one or more additional limitations on the movement of the robotic system toward each of the respective additional waypoints, and controlling the propulsion system of the robotic system to sequentially move the robotic system to the one or more additional waypoints.

In one example, obtaining the image data includes obtaining a point cloud using one or more structured light sensors.

In one example, determining the limitations on the movement of the robotic system include determining relative locations of one or more objects in the environment based on the image data and restricting movement of the robotic system to avoid colliding with the one or more objects.

In one example, determining the limitations includes using simultaneous localization and mapping to restrict the movement of the robotic system.

In one example, the method also includes stopping movement of the robotic system responsive to the robotic system moving farther than a designated, non-zero distance toward the waypoint.

In one example, the final destination of the robotic system is a brake lever of a vehicle.

In one example, the method also includes switching between manual control of the movement of the robotic system and autonomous movement of the robotic system based on input received from a control unit disposed off-board the robotic system.

In one embodiment, a robotic system includes a robotic vehicle having a propulsion system configured to propel the robotic vehicle, one or more structured light sensors configured to be disposed onboard the robotic vehicle and to obtain point cloud data representative of an external environment, and a controller configured to be disposed onboard the robotic vehicle and to determine a waypoint for the robotic vehicle to move toward. The waypoint is located between a current location of the robotic vehicle and a brake lever of a rail vehicle. The controller also is configured to determine limitations on movement of the robotic vehicle toward the waypoint. The limitations are based on the point cloud data. The controller is configured to control the propulsion system to move the robotic vehicle to the waypoint subject to the limitations on the movement to avoid colliding with one or more objects.

In one example, the controller also is configured to determine one or more additional waypoints subsequent to the robotic vehicle reaching the waypoint, determine one or more additional limitations on the movement of the robotic vehicle toward each of the respective additional waypoints, and control the propulsion system of the robotic vehicle to sequentially move the robotic vehicle to the one or more additional waypoints.

In one example, the controller is configured to determine the limitations on the movement of the robotic vehicle by determining relative locations of one or more objects in the external environment based on the point cloud data and restricting movement of the robotic vehicle to avoid colliding with the one or more objects.

In one example, the controller is configured to determine the limitations using simultaneous localization and mapping to restrict the movement of the robotic vehicle.

In one example, the controller also is configured to stop movement of the robotic vehicle responsive to the robotic vehicle moving farther than a designated, non-zero distance toward the waypoint.

In one example, the controller also is configured to switch between manual control of the movement of the robotic vehicle and autonomous movement of the robotic vehicle based on input received from a control unit disposed off-board the robotic vehicle.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
   a robotic vehicle having a propulsion system configured to propel the robotic vehicle between different final destinations and a manipulator configured to perform designated tasks;
   one or more sensors disposed onboard the robotic vehicle configured to obtain image data representative of an external environment and to sense operation of the manipulator, the image data including a pathway along which one or more movable objects travel; and
   a local controller disposed onboard the robotic vehicle and configured to receive input signals from an off-board controller;
   wherein, responsive to receiving an input signal for moving in an autonomous mode, the local controller is configured to move the robotic vehicle toward one of the different final destinations by autonomously and iteratively determining a series of waypoints until the robotic vehicle has reached the one final destination, wherein, for each iteration, the local controller is configured to:
   determine a next waypoint between a current location of the robotic vehicle and the final destination;
   determine movement limitations of the robotic vehicle for moving the robotic vehicle between the current location and the next waypoint, wherein the movement limitations are based on the image data of the external environment including the current location and the next waypoint, the movement limitations configured to restrict movement of the robotic vehicle to at least a designated distance away from the pathway along which the one or more movable objects travel, the movement limitations also configured to avoid collisions between the robotic vehicle and one or more other objects in the external environment; and
   generate control signals in accordance with the movement limitations that are configured to move the robotic vehicle toward the next waypoint; wherein, responsive to receiving the input signal for operating in a teleoperation mode, the local controller is configured to exit the autonomous mode.

2. The system of claim 1, wherein the movement limitations for moving toward at least two different waypoints include at least one of a different direction of movement, a different speed, or a different acceleration of the robotic vehicle.

3. The system of claim 1, wherein the input signal for operating in the tele-operation mode includes a remote command that dictates at least one of a movement of the robotic vehicle or a movement of the manipulator, wherein the local controller is configured to determine whether the remote command is permissible, wherein, responsive to determining that the remote command is permissible, the local controller is configured to generate control signals for performing the remote command.

4. The system of claim 3, wherein the local controller is configured to withhold issuing the control signals for performing the remote command until the local controller determines that the remote command is permissible.

5. The system of claim 3, wherein the remote command includes at least one of a direction of movement, a speed, or an acceleration.

6. The system of claim 1, wherein the pathway is a fixed pathway, the final destinations being adjacent to the movable objects along the fixed pathway, the local controller also configured to generate control signals for controlling the manipulator to perform a task related to the movable objects.

7. The system of claim 1, wherein the local controller is also configured to identify the final destinations based on the image data, the final destinations including a task object for the manipulator to engage.

8. The system of claim 1, further comprising the off-board controller, the off-board controller including an input device configured to be manipulated by a user of the off-board controller.

9. The system of claim 8, wherein the off-board controller is connected to the local controller via a wired connection and communicates to the local controller through the wired connection.

10. A method comprising:
obtaining, at a local controller disposed onboard a robotic vehicle, image data representative of an external environment of the robotic vehicle, the external environment including a designated area where the robotic vehicle performs tasks and a pathway along which one or more movable objects travel, the designated area including different final destinations;
responsive to receiving an input signal for moving the robotic vehicle in an autonomous mode, the method further comprises iteratively generating, by the local controller, control signals for moving the robotic vehicle through a series of waypoints toward one of the different final destinations, wherein each of the iterations includes:
determining a next waypoint between a current location of the robotic vehicle and the final destination;
determining movement limitations of the robotic vehicle for moving the robotic vehicle between the current location and the next waypoint, wherein the movement limitations are based on the image data of the external environment including the current location and the next waypoint, the movement limitations configured to restrict movement of the robotic vehicle to at least a designated distance away from the pathway along which the one or more movable objects travel, the movement limitations configured to avoid collisions between the robotic vehicle and one or more other objects in the external environment;
generating control signals in accordance with the movement limitations that are configured to move the robotic vehicle toward the next waypoint;
responsive to receiving an input signal for operating in a tele-operation mode, the method further comprises exiting the autonomous mode.

11. The method of claim 10, wherein the input signal for operating in the tele-operation mode includes a remote command that dictates at least one of a movement of the robotic vehicle or a movement of the manipulator, the method further comprising determining whether the remote command is permissible, wherein, responsive to determining that the remote command is permissible, generating control signals for performing the remote command.

12. The method of claim 11, wherein the control signals for performing the remote command are withheld until the remote command is determined to be permissible.

13. The method of claim 11, wherein the remote command includes at least one of a direction of movement, a speed, or an acceleration.

14. The method of claim 10, wherein the waypoints are at most fifty centimeters apart.

15. The method of claim 10, further comprising identifying the final destinations based on the image data, the final destinations including a task object for the manipulator of the robotic vehicle to engage.

16. The method of claim 10, wherein determining the movement limitations includes using simultaneous localization and mapping (SLAM) of the image data.

17. The method of claim 10, further comprising performing a task at the one final destination using the manipulator of the robotic vehicle.

18. The method of claim 17, wherein the movement limitations for moving toward at least two different waypoints include at least one of a different direction of movement, a different speed, or a different acceleration of the robotic vehicle.

* * * * *